United States Patent [19]

Wine

[11] 4,387,407
[45] Jun. 7, 1983

[54] VIDEO DISC PLAYER HAVING AUXILIARY VERTICAL SYNCHRONIZING GENERATOR

[75] Inventor: Charles M. Wine, Princeton, N.J.

[73] Assignee: RCA Corporation, New York, N.Y.

[21] Appl. No.: 297,056

[22] Filed: Aug. 27, 1981

[51] Int. Cl.³ .................... H04N 5/76; H04N 5/94
[52] U.S. Cl. .................................. 358/342; 358/336; 360/37.1
[58] Field of Search ............ 358/336, 340, 342, 319, 358/148; 360/37.1, 38.1

[56] References Cited

U.S. PATENT DOCUMENTS 3,573,359  4/1971  Guisinger ......................... 360/37.1
4,286,290  8/1981  Pyles et al. ........................ 358/342

Primary Examiner—Aristotelis M. Psitos
Attorney, Agent, or Firm—E. M. Whitacre; J. S. Tripoli; R. G. Coalter

[57] ABSTRACT

An oscillator produces a signal having a frequency equal to a multiple of the turntable speed of a video disc player. A divider, periodically reset by vertical timing signals produced by the player when in a "play" operating mode, divides the oscillator signal and continuously produces a vertical reference signal equal in phase and frequency to a vertical timing component of the player video output signal. Synchronism is maintained between the player and a TV receiver when the player is in a "pause" operating mode (when the video output signal is squelched) by supplying the reference signal to the receiver, thereby preventing undesirable "roll" of the image produced by the receiver when the player is returned to the "play" operating mode.

10 Claims, 1 Drawing Figure

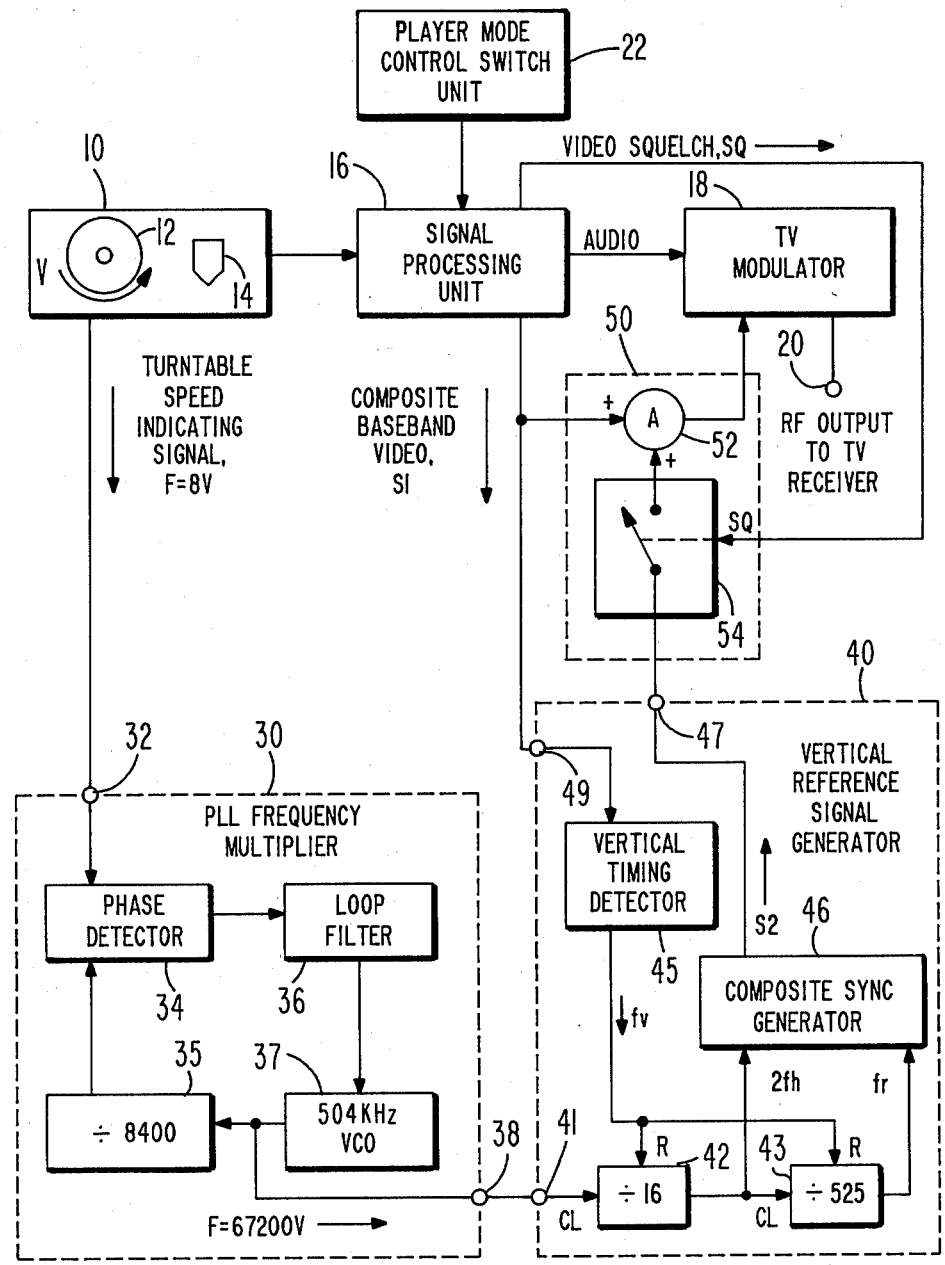

VIDEO DISC PLAYER HAVING AUXILIARY VERTICAL SYNCHRONIZING GENERATOR

This invention relates to video playback apparatus and more particularly to video disc players.

Video disc players are known in which a turntable rotates a video disc record at a predetermined constant angular velocity and a pickup transducer recovers a video output signal from the record which is then processed for application to a conventional television receiver. It is advantageous to "squelch" or inhibit the video output signal during the "pause" operating mode of the player to avoid the aperarance of noise ("snow") in the displayed picture when no signal is being recovered from the record. An example of a video disc player having such a squelch feature is shown and described in U.S. patent application Ser. No. 068,015 entitled "FAST RECOVERY SQUELCH CIRCUIT FOR A VIDEO DISC PLAYER" by Pyles et al., filed Aug. 20, 1979 and now U.S. Pat. No. 4,286,290.

It is recognized herein that in such players, a loss of synchronism may occur between the player and its associated television receiver during the period that the video output signal is squelched. As a result, there may be a tendency for the displayed picture to "roll" when playback of the record is resumed and until the receiver vertical oscillator resynchronizes with the vertical timing component of the player video output signal. The present invention is directed to solving this problem.

A video disc player in accordance with the invention includes a turntable means for rotating a video disc record at a predetermined constant angular velocity and means for recovering a signal from the record to provide a video output signal inclusive of a vertical timing component. A control means inhibits the video output signal during a first operating mode of the player and enables the video output signal during a second operating mode of the player. First means provides a turntable speed indicating signal having a frequency equal to a predetermined multiple of the turntable angular velocity. Second means, responsive to the speed indicating signal and the vertical timing component, continuously produces a vertical reference signal equal in frequency and substantially equal in phase to the vertical timing component of the video output signal.

In accordance with a further aspect of the invention, third means couples the video output signal to an output means of the player, couples the vertical reference signal to the output means during the first player operating mode, and decouples the vertical reference signal from the output means during the second player operating mode.

In accordance with another aspect of the invention, the substantial equality of the phase relationship between the vertical reference signal and the vertical timing component is provided by circuit means which applies the vertical timing component to a synchronizing input of the second means.

The sole FIGURE is a block diagram of a video disc player embodying the invention. The player includes a turntable mechanism 10 for rotating a video disc record 12 at a predetermined constant angular velocity, V, and a pickup transducer 14 for recovering information signals from the disc. Illustratively, it will be assumed that the player is intended for use with an NTSC standard television receiver (not shown) for playback of records in which information is stored in the form of topological variations and recovered by sensing capacitance variations between transducer 14 and the record 12. See, for example, U.S. Pat. No. 3,783,196 entitled "HIGH DENSITY CAPACITIVE INFORMATION RECORDS AND PLAYBACK APPARATUS THEREFORE" which issued to T. O. Stanley, Jan. 1, 1974. The output of transducer 14 is coupled to the input of a signal processing unit 16 which converts the capacitance variations to baseband audio and video signals representative of the recorded information. A preferred implementation of unit 16 for providing an NTSC format video output signal is described in the aforementioned patent application of Pyles, et al. The baseband audio signal is applied to the sound carrier modulation input of a TV modulator 18, which has an output terminal 20 for connection to the antenna terminals of the television receiver. The composite baseband video signal, S1, is coupled via an adder or summing circuit 52 to the baseband video input terminal of TV modulator 18 which produces video and sound carriers on a selected TV channel for reception by the television receiver.

A player mode control switch unit 22, comprising user activated mode control switches, is coupled to processing unit 16 for controlling various operating modes of the player (e.g., play, pause, slow scan, rapid scan, etc.). Of particular interest to the present invention is that unit 16 produces a video squelch signal, SQ, which causes internal squelch circuitry in unit 16 to inhibit the video output signal S1 when the player is placed in an operating mode in which it is desired that no image be displayed on the receiver coupled to terminal 20. Three such modes are: pause, rapid scan forward, and rapid scan reverse. The squelch signal terminates in operating modes such as play, slow scan forward, and slow scan reverse, where it is desired that an image be displayed on the receiver.

Elements 30–50 comprise an auxiliary vertical synchronizing generator which, in combination with elements 10–22, prevents any tendency for the displayed image of the receiver to "roll" when the player mode is changed from "squelched" to "unsquelched" (i.e., from "pause" to "play", from "rapid scan forward" to "slow scan reverse", etc.). As previously explained, a tendency for picture roll to occur exists in conventional video disc players when changing from a "squelched" to an "unsquelched" video mode because during the time that the player video signal is squelched, the receiver vertical oscillator may assume a "free running" mode. Accordingly, when the video signal is unsquelched, the vertical timing component of the player video signal may differ substantially in phase or frequency from that produced by the receiver vertical oscillator. This difference may be sufficient to cause picture roll as the receiver vertical oscillator (or vertical countdown circuit in digital receivers) reacquires synchronism with the vertical timing component of the player video signal.

The auxiliary vertical synchronizing generator comprises a phase lock loop (PLL) frequency multiplier 30, a vertical reference signal generator 40 and a video signal coupling circuit 50. Multipler 30 has an input terminal 32 coupled to receive a turntable speed indicating signal, F, from player mechanism 10.

In video disc players in which the turntable is driven by a line frequency synchronous motor the signal F may be derived directly from the AC supply for the motor. Where the turntable is driven by a servo controlled DC motor, the signal F may be taken from the servo system tachometer, from the motor commutation circuitry or some other suitable point in the motor servo speed control system where a signal proportional to the angular velocity, V, of the turntable may be obtained.

For purposes of illustration, it will be assumed that the record 12 is of the kind intended for playback at an angular velocity, V, of 7.5 revolutions per second and is recorded with video signals having an integral number of fields (e.g., 8) per convolution of the information track. It will also be assumed that the record is rotated by means of an AC synchronous drive motor in mechanism 10 operated from a 60 Hz supply source and that the signal F is taken directly from the supply source. (Such records and players for use with NTSC standard TV receivers are commercially available, for example, from RCA Corporation.) Under these assumptions, the turntable speed indicating signal, F, will equal 60 Hz or eight times the angular velocity, V, of the record.

The turntable speed indicating signal F is applied to the input terminal 32 of phase lock loop frequency multiplier 30 which includes a phase detector 34 which compares the signal F with the output of a divider 35 and supplies an error signal via a loop filter 36 to a 504 KHz voltage controlled oscillator 37 which, in turn, supplies clock signals to the divider 35 and to an output terminal 38. The divider has a division factor of 8400 whereby the VCO is locked to a frequency of 8400 F (the oscillator center freqency) so that the turntable speed indicating signal F supplied to terminal 38 corresponds to 67,200 times the angular velocity, V, (7.5 Hz) of the video disc record 12. The phase detector is preferably of the edge triggered type as in the type CD4046 integrated circuit so that the PLL produces a zero phase error when in equilibrium (i.e., when phase lock is acquired).

The choice of the multiplication factor of PLL 30 is selected to facilitate subsequent processing of the turntable speed indicating signal produced by VCO 37. Specifically, the VCO frequency of 504 KHz (67,200 times the angular velocity, V) is an integer power of 2 of the NTSC horizontal line frequency (15,750 Hz). Accordingly, a line frequency signal, fH, may be obtained from the VCO output signal by cascading binary divider stages and no feedback circuity is necessary in the divider to produce the line frequency output signal. For example, 504 KHz equals 32 times fH so a simple cascade connection of five toggle type binary flip flops will produce an output signal equal to fH. Four flip flops (divide by 16) will produce an output signal equal to 2 fH.

The output signal (504 KHz) of VCO 37 is applied to an input 41 of vertical reference signal generator 40 which includes a cascade connection of two dividers 42 and 43 which divide the input signal by factors of 16 and 525, respectively, thereby producing an output signal from the first divider 42 equal to 2 fH (i.e., 31,500 Hz) and a vertical timing reference signal, fr, output signal from the second divider equal to fr (60 Hz, the NTSC vertical field rate). To maintain substantial equality of the phase of fr with the vertical timing component, fv, of the baseband video output signal S1, generator 40 includes circuit means which applies the vertical timing component to a synchronizing input of the divider chain 42, 43.

In more detail, the signal S1 is applied to an input terminal 49 of generator 40 which is coupled to reset input terminals of dividers 42 and 43 via a vertical timing signal detector 45 which separates fv from S1.

When the signal S1 is not squelched each divider is therefore reset to zero in response to fv, thereby forcing fr to be in phase with fv, which is recorded on the video disc record 12. Since the angular velocity of record 12 is constant, when S1 terminates in the squelch mode of operation, the VCO 37 continues to provide a precise frequency reference (504 KHz) locked to the line frequency and thus to the vertical timing signal, fv recorded on the record. The divider chain 42, 43 thus continues to produce the timing reference signal fr in the phase it was last set to by fv.

The signal fr is used as a substitute for fv when the player video output signal is squelched to thereby maintain synchronism of the vertical oscillator of the TV receiver with rotation of record 12 so that when normal play is resumed and fv is again present, there will be no change in the vertical oscillator frequency or phase and thus no tendency for "roll" of the displayed image to occur. For this purpose, it is desirable that the waveform of fr bear a reasonable resemblance to that of fv. To facilitate this, generator 40 includes a composite sync generator 46 which receives the double line frequency (2 fH) output of divider 42 and the vertical reference freqency fr output of divider 43 and supplies a standard NTSC vertical timing signal S2 to output terminal 47. Composite sync generators are known and used, for example, in television cameras for composite sync signal generation.

The video signal coupling unit 50 provides the functions of: (1) coupling S1 to TV modulator 18; (2) coupling S2 to modulator 18 when S1 is squelched; and (3) decoupling S2 from modulator 18 when S1 is unsquelched. For this purpose, unit 50 could be implemented by means of a two position video switch which selects one or the other of S1 and S2 in response to the player squelch signal SQ. Such switches, however, are relatively complex and may introduce an undesirable switching transient during the switch changeover period. To avoid such a problem, the coupling unit 50 includes an adder 52 and a one position (i.e., on/off) type of video switch (e.g., a transmission gate, a non-additive mixer, etc.). The adder or summing circuit 52 has a first input coupled to processing unit 16 for receiving the signal S1, a second input coupled via a video switch 54 to terminal 47 of generator 40 for receiving the signal S2 and an output connected to the baseband video modulation input terminal of TV modulator 18. The video squelch signal, SQ, produced within signal processing unit 16 is applied to switch 54 for closing the switch when the SQ signal is present and opening the switch when the SQ signal terminates. Suitable circuitry for producing the squelch signal is described in the aforementioned U.S. patent application of Pyles, et al.

In operation, the signal S1 (whether squelched or unsquelched) is continuously coupled to the input of modulator 18 (via adder 52) and the signal S2 is coupled to the modulator only when S1 is squelched. Accordingly, the modulator input terminal is not subjected to an "open circuit" condition during the switching operation whereby the aforementioned transient effects are minimized. An alternative would be to provide the coupling of S1 and S2 to modulator 18 via a squelch controlled selector switch of the "make-before-break" or "shorting" kind but such a switch would increase the complexity of the coupling circuit. The preferred arrangement shown avoids such complexity and so offers an improvement in reliability as well as a reduction of transient effects.

In the foregoing example of the invention, is was assumed that the player was intended for use with NTSC standard television receivers (525 line, 60 fields/second video) and records designed for playback at a constant angular velocity of 7.5 revolutions/second (450 rpm) with 8 fields per convolution of the information track. The principles of the present invention may readily be applied to video disc players intended for use with receivers having other video formats (e.g., PAL or SECAM) or records designed for playback at other (constant) angular velocities. As an example, the player may be modified for use with a PAL format receiver (625 line, 50 fields/second) and 375 RPM, 8 field/revolution video disc records rotated by a 50 Hz synchronous motor by changing the division factors of dividers 35 and 43 from 8400 and 525, respectively, to 10,000 and 625, respectively. In such a case, the turntable speed indicating signal F will equal 50 Hz and VCO 37 will be phase locked to a frequency of 500 KHz or 8000 times the angular velocity of record 12. Divider 42 will produce output signals at a frequency of 31,250 Hz or twice the PAL line frequency (2 fH) and divider 43 will produce an output vertical reference frequency signal, fr, equal to 50 Hz (the PAL vertical timing signal frequency). In PAL format video disc players, it is preferable that the record 12 be recorded in the format proposed by Carnt et al. in U.S. Pat. No. 4,200,881 entitled "VIDEO DISC SYSTEMS" which issued Apr. 29, 1980, and in which, inter alia, the normal phase alterations of the color burst signal component is inhibited during recording of the record. Carnt et al. disclose circuitry suitable for use in processing unit 16 for reinstating the line-to-line phase alteration of the burst component of the recovered video signal.

What is claimed is:

1. A video disc player, comprising:
   turntable means for rotating a video disc record at a predetermined substantially constant angular velocity;
   means for recovering a signal from said record to provide a video output signal having a vertical timing component;
   control means for inhibiting said video output signal during a first operating mode of said player and for enabling said video output signal during a second operating mode of said player;
   first means for providing a turntable speed indicating signal having a frequency related to said constant angular velocity; and
   second means responsive to said speed indicating signal and to said vertical timing component of said video output signal for continuously producing a vertical reference signal equal in frequency and substantially equal in phase to said vertical timing component.

2. A video disc player as recited in claim 1 wherein said second means comprises:
   divider means having an input means for receiving said speed indicating signal, and output means for providing said vertical reference signal; and
   means for applying said vertical timing component of said video output signal to a synchronizing input of said divider means.

3. A video disc player as recited in claim 2 wherein said divider means is of a type having a division factor equal to an integer multiple of the number of lines per frame of said video output signal.

4. A video disc player as recited in claim 1 further comprising:
   output means; and
   third means for coupling said video output signal to said output means, for coupling said vertical reference signal to said output means during said first operating mode and for decoupling said vertical reference signal from said output means during said second operating mode.

5. A video disc player as recited in claim 4 wherein said third means comprises:
   means for combining said video output signal with said vertical reference signal for application to said output means; and
   means for inhibiting said vertical reference signal during said second operating mode of said player.

6. A video disc player as recited in claim 1 wherein said first means comprises:
   oscillator means for supplying said turntable speed indicating signal to said second means; and means operatively coupled to said oscillator means and to said turntable means for regulating the frequency of said oscillator means at a predetermined multiple of said constant angular velocity.

7. A video disc player, comprising:
   turntable means for rotating a video disc record at a predetermined substantially constant angular velocity;
   means for recovering a signal from said record to provide a video output signal having a vertical timing component;
   means for squelching said video output signal in a first operating mode of said player and for unsquelching said video output signal in a second operating mode of said player;
   oscillator means synchronized with rotation of said turntable means for producing a signal having a frequency equal to a predetermined integer multiple of said substantially constant angular velocity;
   divider means for dividing the oscillator signal by a given number for continuously producing a vertical reference signal having a frequency equal to that of said vertical timing component; and
   synchronizing means coupled to said divider means for synchronizing said vertical reference signal with said vertical timing component.

8. A video disc player as recited in claim 7 further comprising:
   output means;
   means for applying said video output signal to said output means; and
   means for applying said vertical reference signal to said output means during said first operating mode of said player when said video output signal is squelched as a substitute for said vertical timing component.

9. A video disc player as recited in claim 7 wherein said divider means is of a type having a division factor equal to an integer multiple of the number of lines per frame of said video output signal.

10. A video disc player as recited in claim 7 further comprising:
    phase lock loop means responsive to a signal manifestation characteristic associated with said turntable means for synchronizing said oscillator means with said rotation of said turntable means.

* * * * *